United States Patent
Dupuis et al.

(10) Patent No.: US 8,750,654 B2
(45) Date of Patent: Jun. 10, 2014

(54) PHOTONIC INTEGRATED CIRCUIT HAVING A WAVEGUIDE-GRATING COUPLER

(71) Applicant: Alcatel-Lucent USA Inc., Murray Hill, NJ (US)

(72) Inventors: Nicolas Dupuis, New York, NY (US); Christopher R. Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/919,396

(22) Filed: Jun. 17, 2013

(65) Prior Publication Data

US 2013/0277331 A1 Oct. 24, 2013

Related U.S. Application Data

(62) Division of application No. 12/640,151, filed on Dec. 17, 2009, now Pat. No. 8,494,315.

(51) Int. Cl.
| | | |
|---|---|---|
| *G02B 6/12* | (2006.01) | |
| *G02B 6/125* | (2006.01) | |
| *G02B 6/30* | (2006.01) | |
| *G02B 6/136* | (2006.01) | |
| *B82Y 20/00* | (2011.01) | |
| *B29D 11/00* | (2006.01) | |
| *G02B 6/10* | (2006.01) | |
| *G02B 6/124* | (2006.01) | |
| *G02B 6/293* | (2006.01) | |

(52) U.S. Cl.
CPC  *G02B 6/10* (2013.01); *G02B 6/125* (2013.01); *G02B 6/305* (2013.01); *G02B 6/136* (2013.01); *B82Y 20/00* (2013.01); *G02B 6/12002* (2013.01); *B29D 11/00663* (2013.01); *G02B 6/124* (2013.01); *G02B 6/29332* (2013.01)

USPC .................................................. 385/12

(58) Field of Classification Search
USPC .................................................. 385/14
See application file for complete search history.

(56) References Cited

U.S. PATENT DOCUMENTS

| | | |
|---|---|---|
| 4,114,257 A | 9/1978 | Bellavance |
| 4,553,811 A | 11/1985 | Becker et al. |

(Continued)

FOREIGN PATENT DOCUMENTS

| | | |
|---|---|---|
| CN | 101203783 A | 6/2008 |
| JP | 7064033 A | 3/1995 |

(Continued)

OTHER PUBLICATIONS

Chinese Office Action; Mailed Jun. 4, 2013 for corresponding Chinese Application No. 201080057169.0.

(Continued)

*Primary Examiner* — Uyen Chau N Le
*Assistant Examiner* — Hoang Tran
(74) *Attorney, Agent, or Firm* — Mendelsohn, Drucker & Dunleavy, P.C.; Yuri Gruzdkov; Steve Mendelsohn (57) ABSTRACT

A photonic integrated circuit (PIC) having a waveguide-grating coupler with two evanescently coupled waveguides. The first waveguide is fabricated using materials suitable for manufacturing active optical elements in the PIC. The second waveguide is fabricated using materials capable of providing a relatively high index-of-refraction contrast for the constituent waveguide grating. The waveguide-grating coupler is compatible with the III-V semiconductor technology while being relatively easy to fabricate on an industrial scale.

16 Claims, 5 Drawing Sheets

(56) References Cited

U.S. PATENT DOCUMENTS

| | | | |
|---|---|---|---|
| 5,333,000 | A | 7/1994 | Hietala et al. |
| 5,416,628 | A | 5/1995 | Betti et al. |
| 5,416,861 | A * | 5/1995 | Koh et al. ............... 385/14 |
| 5,448,581 | A | 9/1995 | Wu et al. |
| 5,539,850 | A | 7/1996 | Henry et al. |
| 6,174,748 | B1 * | 1/2001 | Jeon et al. ............... 438/31 |
| 7,058,259 | B2 | 6/2006 | Stuart |
| 7,065,272 | B2 | 6/2006 | Taillaert et al. |
| 7,116,478 | B2 | 10/2006 | Momoki et al. |
| 7,343,104 | B2 | 3/2008 | Doerr et al. |
| 7,437,029 | B2 * | 10/2008 | Joyner et al. ............... 385/14 |
| 2002/0179912 | A1 | 12/2002 | Batchko et al. |
| 2003/0175005 | A1 | 9/2003 | Bauer et al. |
| 2003/0185514 | A1 | 10/2003 | Bendett et al. |
| 2003/0235370 | A1 | 12/2003 | Taillaert et al. |
| 2005/0286911 | A1 | 12/2005 | Doerr et al. |
| 2008/0152362 | A1 | 6/2008 | Koc |
| 2008/0267638 | A1 | 10/2008 | Nakashima et al. |
| 2010/0054761 | A1 | 3/2010 | Chen et al. |
| 2010/0158521 | A1 | 6/2010 | Doerr et al. |
| 2011/0038631 | A1 | 2/2011 | Doerr |

FOREIGN PATENT DOCUMENTS

| | | |
|---|---|---|
| JP | 2003234532 A | 8/2003 |
| JP | 2004096137 A | 3/2004 |
| JP | TW595136 B | 6/2004 |
| TW | 595136 B | 6/2004 |
| WO | 2008122607 A1 | 10/2008 |
| WO | WO2009035513 A1 | 3/2009 |

OTHER PUBLICATIONS

Frederik Van Laere, et al., "Efficient Polarization Diversity Grating Couplers in Bonded InP-Membrane," IEEE Photonics Technology Letters, vol. 20, No. 4, Feb. 15, 2008, pp. 318-320.

F. Van Laere, et al, "Compact and Efficient Fibre-to-Waveguide Grating Couplers in InP-Membrane," Electronics Letters, vol. 42 No. 6, Mar. 16, 2006 (2 pages).

Frederik Van Laere, et al., "Compact Slanted Grating Couplers Between Optical Fiber and InP—InGaAsP Waveguides," IEEE Photonics Technology Letters, vol. 19, No. 6, Mar. 15, 2007, pp. 396-398.

PCT International Search Report for International Application No. PCT/US09/37746, dated Aug. 26, 2009 (7 pages).

Dirk Taillaert, et al., "A Compact Two-Dimensional Grating Coupler Used As a Polarization Splitter," IEEE Photonics Technology Letters, vol. 15, No. 9, Sep. 9, 2003, pp. 1249-1251.

Gunther Roelkens, et al., "Silicon-on-Insulator Ultra-Compact Duplexer Based on a Diffractive Grating Structure," Optics Express, OSA, Washington, DC, vol. 15, No. 16, Aug. 6, 2007, pp. 10019-10096.

F. Heismann, et al., "Automatic Polarisation Demultiplexer for Polarisation-Multiplexed Transmission Systems," Electronics Letters, IEE Stevenge, GB vol. 29, No. 22, Oct. 28, 1993, pp. 1965-1966.

R.A. Griffin, et al., "Optical Differential Quadrature Phase-Shift Key (oDQPSK) for High Capacity Optical Transmission," Optical Fiber Communications Conference, Postconference Technical Digest, Postdeadline Papers (IEEE CAT. No. 02CH37339) PTO SOC. America Washington DC, USE; [Trends in Optics and Photonics Series. (TOPS)], vol. TOPS., vol. 70, Mar. 17, 2002, pp. 367-368.

Ip Ezra, et al., "Coherent Detection in Optical Fiber Systems," Retrieved from the Internet: <URL:http://www,stanford.edu/Wavelet/pubs/Coherent_Detection_invited.pdf> [Retrieved on Apr. 25, 2008] (37 pages).

Chinese Office Action; Mailed Jun. 4, 2013 for corresponding CN Application No. 201080057169.0.

Doerr, C.R. et al.; "Simultaneous reception of both quadratures of 40-Gb/s DQPSK using a simple monolithic demodulator"; PDP12; Lucent Technologies; Optical Society of America (2005).

Wang, J. et al.; "Evanescent-Coupled Ge p-i-n Photodetectors on Si-Waveguide With SEG-GE and Comparative Study of Lateral and Vertical p-i-n Configurations"; IEE Electron Device Letters; vol. 29, No. 5; May 2008.

Vermeulen, D. et al; "Silicon-on-Insulator Nanophotonic Waveguide Circuit for Fiber-to-the-Home Transceivers"; ECOC 2008, 21-25; Sep. 2008, Brussels, Belgium.

Notification of Transmittal of the International Search Report and The Written Opinion of the International Searching Authority; Mailed Aug. 31, 2001 for corresponding PCT Application No. PCT/US2010/060659.

Notice of Preliminary Rejection; Mailed on Mar. 20, 2013 for related KR Application No. 2011-7021860.

Restriction Requirement; Mailed Jun. 6, 2012 for corresponding U.S. Appl. No. 12/640,151.

Non-Final Office Action; Mailed Sep. 28, 2012 for corresponding U.S. Appl. No. 12/640,151.

Notice of Allowance and Fee(s) Due; Mailed Mar. 21, 2013 for corresponding U.S. Appl. No. 12/640,151.

* cited by examiner

PHOTONIC INTEGRATED CIRCUIT HAVING A WAVEGUIDE-GRATING COUPLER

CROSS-REFERENCE TO RELATED APPLICATIONS

This application is a divisional of U.S. patent application Ser. No. 12/640,151, filed on Dec. 17, 2009, and entitled "PHOTONIC INTEGRATED CIRCUIT HAVING A WAVEGUIDE-GRATING COUPLER," which is incorporated herein by reference in its entirety.

BACKGROUND

1. Field of the Invention

The present invention generally relates to optical communication equipment and, more specifically but not exclusively, to optical devices for coupling light into and out of photonic integrated circuits.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Photonic integrated circuits (PICs) are used for various applications in telecommunications, instrumentation, and signal-processing fields. A PIC typically uses optical waveguides to implement and/or interconnect various on-chip components, such as optical switches, couplers, routers, splitters, multiplexers/demultiplexers, modulators, amplifiers, wavelength converters, optical-to-electrical (O/E) and electrical-to-optical (E/O) signal converters, etc. A waveguide in a PIC is usually an on-chip solid light conductor that guides light due to an index-of-refraction contrast between the waveguide's core and cladding.

For proper operation, a PIC typically needs to efficiently couple light between an external optical fiber and one or more of on-chip waveguides. An exemplary grating coupler that can be used for this purpose is disclosed, e.g., in U.S. Pat. No. 7,065,272, which is incorporated herein by reference in its entirety. However, one problem with some grating couplers is that they work well only when implemented using materials that provide a relatively high index-of-refraction contrast between the core and both the upper and lower cladding layers, whereas certain active optical elements of the PIC require the use of materials that can provide only a relatively low index-of-refraction contrast.

SUMMARY

Advantageously, some embodiments of the waveguide-grating couplers disclosed herein do not have low light-coupling efficiencies of prior-art waveguide-grating couplers and are convenient for integration into photonic integrated circuits (PICs) having III-V semiconductor-based active optical elements. In particular, problems of the prior art are addressed by providing a waveguide-grating coupler having two evanescently coupled waveguides. The first waveguide is fabricated using materials suitable for manufacturing active optical elements, and the second waveguide is fabricated using materials capable of providing a relatively high index-of-refraction contrast for the constituent waveguide grating.

According to one embodiment, provided is an apparatus having (i) a first optical waveguide being supported on a surface of a substrate; (ii) a second optical waveguide being supported over the surface; (iii) an optical coupler being supported over the surface and optically coupling the first and second waveguides; and (iv) a waveguide grating being supported over the surface and being adapted to transfer optical power between one or more waveguide modes of the second waveguide and an optical beam formed by or applied to the waveguide grating. The second waveguide has an offset-transition region for which a core of the second waveguide has an offset distance that gradually changes from a first distance corresponding to the coupler to a different second distance.

According to another embodiment, provided is a photonic integrated circuit (PIC) having (i) a substrate; (ii) an optical signal-processing (OSP) circuit being supported on the substrate and having at least one active optical element; (iii) a first optical waveguide being optically coupled to the active optical element; (iv) a second optical waveguide having a waveguide grating adapted to transfer optical power between one or more waveguide modes of the second optical waveguide and an optical beam formed by or applied to the waveguide grating; and (v) an optical coupler that couples the first and second waveguides only via evanescent fields. The second optical waveguide has an offset-transition region, within which a core of the second optical waveguide has an offset distance with respect to the substrate that gradually changes from a first distance to a different second distance.

According to yet another embodiment, provided is a method of fabricating an optical device having the steps of: (A) providing a substrate having a first optical waveguide thereon, the first optical waveguide having a cladding layer with a wedge-like portion; (B) forming a core of a second optical waveguide on the wedge-like portion and an exposed portion of the cladding of the first waveguide; and (C) forming an array of cavities in the core of the second optical waveguide to define therein a waveguide grating.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
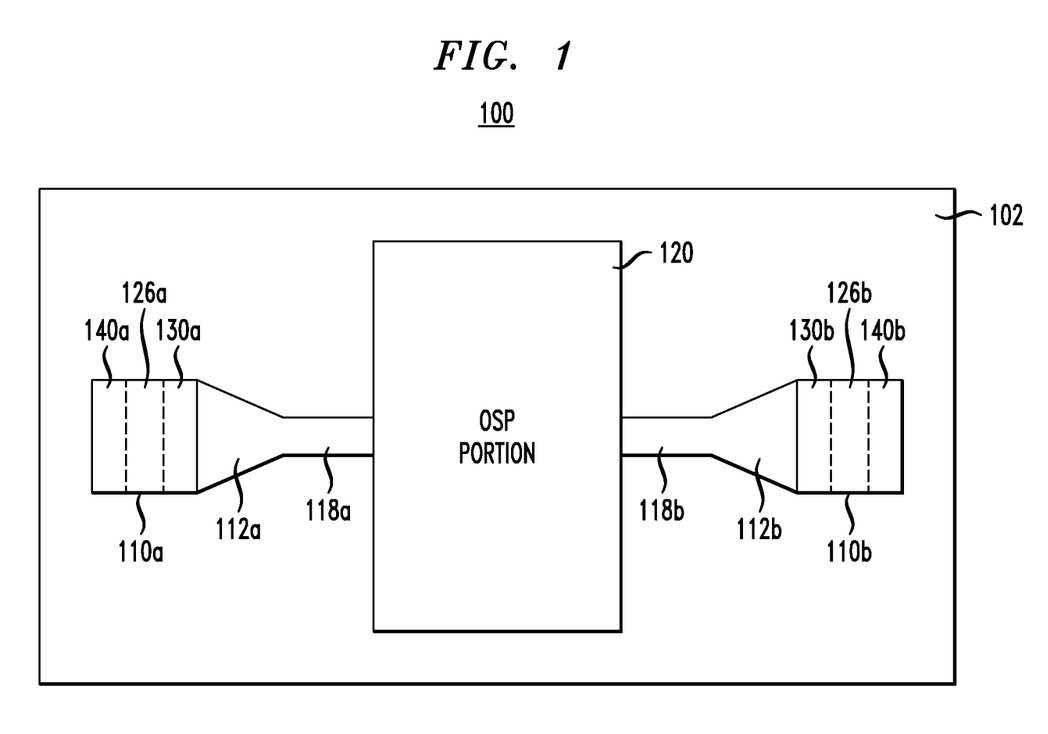
FIG. 1 shows a top view of a photonic integrated circuit (PIC) according to one embodiment of the invention.

FIG. 1 shows a top view of a photonic integrated circuit (PIC) 100 according to one embodiment of the invention. PIC 100 is a substantially planar monolithic device, whose lateral dimensions (e.g., dimensions within the plane of FIG. 1) are significantly larger than the transverse dimension (e.g., the height or thickness along the axis orthogonal to the plane of FIG. 1). PIC 100 is illustratively shown as having two optical couplers 110a-b and one optical signal-processing (OSP) portion or circuit 120, although a PIC with a different number of optical couplers and/or OSP portions is also possible. In a typical embodiment, couplers 110a-b and OSP portion 120 are implemented on and supported by a common substrate 102.

In a representative configuration of PIC 100, a first external optical fiber (not explicitly shown) oriented approximately orthogonally with respect to the plane of FIG. 1 applies an unguided incoming beam of light to coupler 110a. As used herein, the term "unguided" refers to an optical beam that is not laterally confined by a light-guiding structure, such as an on-chip waveguide or an optical fiber. Due to a finite spatial separation between the tip of the external optical fiber and coupler 110a, the optical beam impinging upon the coupler is an unguided optical beam. Coupler 110a couples the light of the received optical beam, through a waveguide taper 112a, into a planar waveguide 118a. Waveguide 118a then delivers the coupled light to OSP portion 120. OSP portion 120 processes the light using one or more optical elements located therein and applies the resulting light to a planar waveguide 118b, which then directs that light, through a waveguide taper 112b, to coupler 110b. Coupler 110b forms an outgoing unguided optical beam, which is coupled into a second external optical fiber (not explicitly shown) oriented approximately orthogonally with respect to the plane of FIG. 1.

Structurally, coupler 110 comprises an evanescent coupler 130, an offset-transition region 126, and a waveguide grating 140. Evanescent coupler 130 couples light between waveguide taper 112 and a second waveguide (not explicitly shown in FIG. 1) that is an internal element of coupler 110. Offset-transition region 126 serves to gradually decrease the evanescent coupling at one of the edges of evanescent coupler 130. Waveguide grating 140 serves to transfer optical power between one or more waveguide modes of the second waveguide and an unguided optical beam formed by or applied to the waveguide grating. Representative embodiments of evanescent coupler 130, offset-transition region 126, and waveguide grating 140 are described in more detail below in reference to FIGS. 2 and 3.

In a representative embodiment, OSP portion 120 comprises one or more active optical components, such as a semiconductor optical amplifier, a laser diode, and/or an optical modulator. These one or more active optical components are implemented, as known in the art, using III-V semiconductor materials, such as binary III-V compounds and/or ternary, quaternary, or quinary III-V alloys. While the III-V semiconductor compounds and alloys offer well-known advantages for the implementation of active optical components, they can provide only a modest index-of-refraction contrast between the core and cladding materials. For example, in an InP-platform technology, the indices of refraction of the core and cladding materials are about 3.5 and 3.17, respectively, which produces an index-of-refraction contrast of about 0.09. If a prior-art optical-coupler design were used to implement optical couplers 110a-b, then, disadvantageously, either the light-coupling efficiency would be relatively low or the fabrication process would be too complicated and/or expensive, or both. In contrast, optical coupler 110 advantageously provides a relatively high light coupling efficiency (e.g., greater than about 35%) while being relatively easy to fabricate on an industrial scale.

Figure 2A:
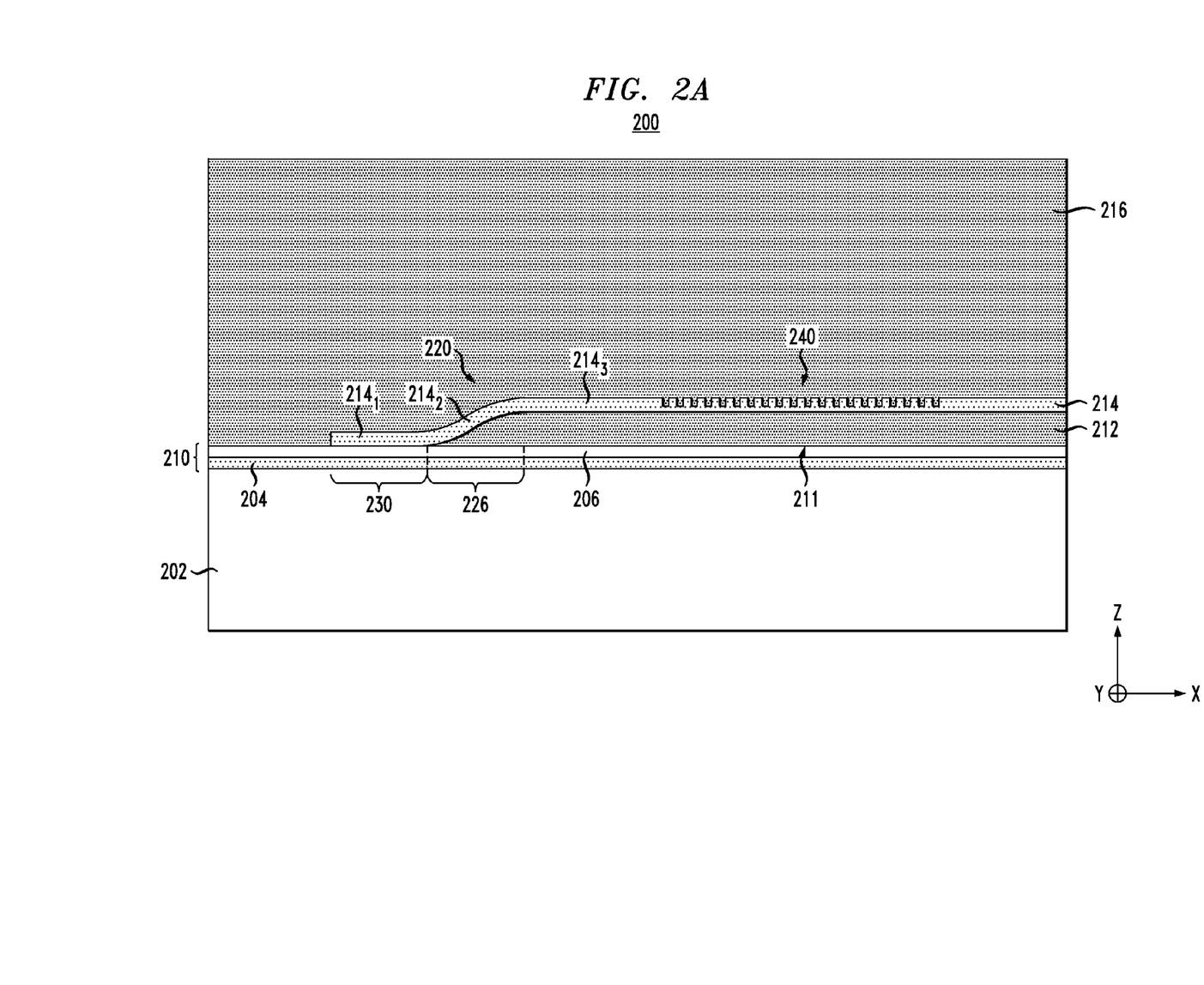
FIGS. 2A-C show cross-sectional side views of an optical coupler that can be used in the PIC of FIG. 1 according to one embodiment of the invention.
Figure 2B:
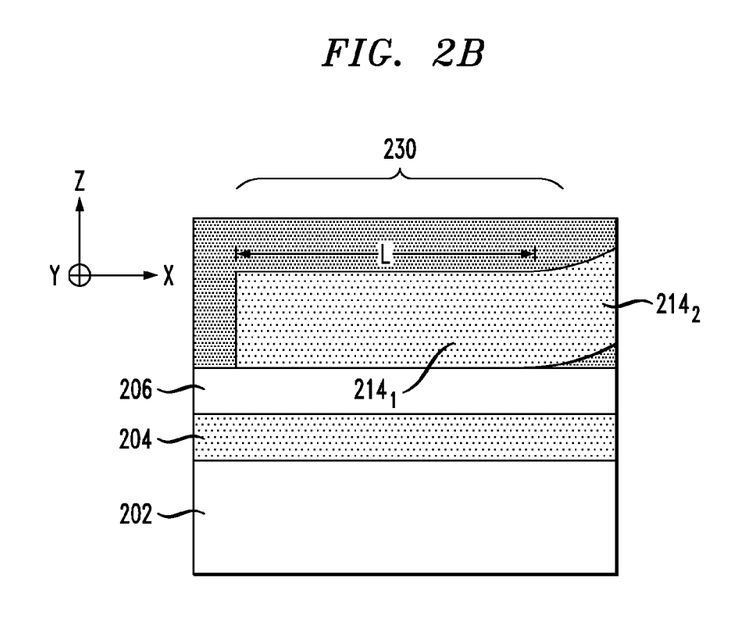
Figure 2C:
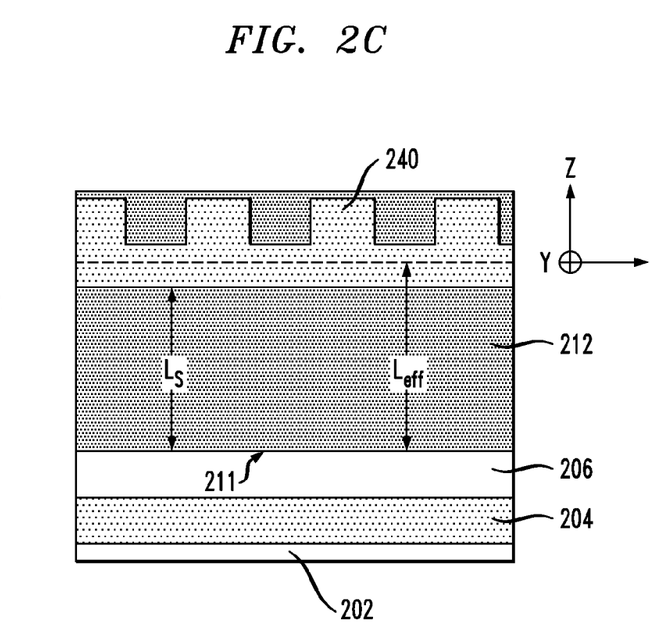

FIGS. 2A-C show cross-sectional side views of an optical coupler 200 that can be used as optical coupler 110 according to one embodiment of the invention. More specifically, FIG. 2A shows a full cross-sectional side view of coupler 200. FIG. 2B shows an enlarged cross-sectional side view of a structure 230 for evanescently coupling light between waveguides 210 and 220 in coupler 200. FIG. 2C shows an enlarged cross-sectional side view of a waveguide grating 240 used in coupler 200. In the description that follows, the operation of coupler 200 is illustratively explained in reference to a process of coupling light out of the corresponding PIC. From this description, one of ordinary skill in the art will readily understand the operation of coupler 200 in a process of coupling light into the PIC.

Optical coupler 200 has two waveguides 210 and 220 that are evanescently coupled to one another via structure 230 (see FIGS. 2A and 2B). Waveguide 210 is optically coupled to and configured to receive light from an OSP portion of the corresponding PIC, e.g., as indicated in FIG. 1. Structurally, waveguide 210 comprises (i) a core layer 204 of a high-index material and (ii) two cladding layers 202 and 206 of low-index material(s) that are adjacent to the core layer. In one embodiment, cladding layer 202 is a substrate layer, which also serves as a substrate for the OSP portion of the PIC and is analogous to substrate 102 of PIC 100 (FIG. 1). Exemplary materials for substrate 202 and cladding layer 206 are InP, GaN, sapphire, InAs, and GaAs. Note that substrate 202 and cladding layer 206 can be made of the same material or different materials. Exemplary materials for core layer 204 are ternary GaInAs, quaternary GaInAsP, and quaternary AlGaInAs.

Waveguide 220 has (i) a core layer 214 of a high-index material and (ii) two cladding layers 212 and 216 of low-index material(s). Exemplary materials for core layer 214 are amorphous silicon and polycrystalline silicon. Exemplary materials for cladding layers 212/216 are silicon oxide and silicon oxynitride. Note that, similar to substrate 202 and cladding layer 206, cladding layers 212/216 can be made of the same material or different materials.

Waveguide 220 has an offset-transition region 226, wherein the vertical separation between core layer 204 of waveguide 210 and core layer 214 of waveguide 220 is not constant. Herein, the term "vertical" refers to the Z-coordinate axis, which is orthogonal to the principal (XY) plane of the PIC defined by the principal plane of the substrate, e.g., substrate 102 (FIG. 1) or substrate 202 (FIG. 2). A first portion $214_1$ of core layer 214 is directly adjacent to cladding layer 206 and is generally parallel to the XY plane (see FIG. 2B). A second portion $214_2$ of core layer 214 is oriented at an angle with respect to the XY plane, which causes the vertical separation between core layers 204 and 214 to gradually increase from the left side to the right side of portion $214_2$ (see FIG. 2A). In a typical embodiment, the angle between portion $214_2$ and the XY plane is greater than about 3 degrees. A third portion $214_3$ of core layer 214 is generally parallel to the XY plane and is connected to a waveguide grating 240 defined in core layer 214 (see FIGS. 2A and 2C).

Referring to FIG. 2B, core-layer portion $214_1$ and the underlying portions of cladding layer 206 and core layer 204 create structure 230. Various parameters of waveguides 210 and 220, such as the thicknesses and refractive indices of the various constituent layers, can be chosen so as to match the two waveguides within structure 230 in terms of their propagation constants. With waveguides 210 and 220 having substantially equal propagation constants, evanescent light coupling between core layers 204 and 214 in structure 230 will cause the optical energy initially confined in one waveguide to substantially fully transfer into the other waveguide over a distance (Λ) expressed by Eq. (1):

$$\Lambda = \frac{\pi}{\beta_e - \beta_o} \quad (1)$$

where $\beta_e$ and $\beta_o$ are the even and odd propagation constants, respectively, of the matched waveguides.

Suppose now that an optical signal (e.g., received from OSP portion 120, FIG. 1) is initially confined in waveguide 210 and propagates from the left side of FIG. 2A toward structure 230. If the X dimension of structure 230 (labeled L in FIG. 2B) is chosen to be $(2m+1)\Lambda$, where m is zero or a positive integer, then, at the right side of structure 230 in FIGS. 2A and 2B, the optical signal will be primarily confined in waveguide 220. As the optical signal enters core-layer portion $214_2$, the increased separation between core layers 204 and 214 disrupts the evanescent coupling between waveguides 210 and 220 and causes the optical signal to remain confined in waveguide 220 thereafter.

Note that, for positive m values, the energy of the optical signal spatially beats m times between waveguides 210 and 220 within structure 230 before waveguide 220 separates sufficiently from waveguide 210 to disrupt the evanescent coupling between the waveguides at the right side of the structure. As used herein, the term "one spatial beat" refers to a spatial process of changing the optical power distribution, e.g., from a state of being primarily confined to waveguide 210 to a state of being primarily confined to waveguide 220 and then back to waveguide 210. A representative threshold value that can be used to delimit the power-redistribution process is, e.g., 80% of the total optical power contained within a transverse (YZ) cross-section of structure 230. Using this threshold value, it can be said that the optical power is primarily confined to one of the waveguides when the waveguide mode(s) corresponding to that waveguide contain about 80% of the total optical power within the transverse cross-section.

Core-layer portions $214_2$ and $214_3$ of waveguide 220 direct the optical signal from structure 230 to waveguide grating 240. In a representative embodiment, waveguide grating 240 comprises a plurality of cavities, pillars, and/or holes etched into or formed on an upper surface of core layer 214 to form a one- or two-dimensional pattern (see FIGS. 2A and 2C). This pattern causes the power of the optical signal to be diffracted vertically from waveguide grating 240, both in the positive and negative Z directions. A representative grating that can be used as waveguide grating 240 is disclosed, e.g., in the above-cited U.S. Pat. No. 7,065,272.

In an exemplary embodiment, core layer 214 is made of silicon, and cladding layers 212/216 are made of silicon oxide. This combination of materials enables waveguide grating 240 to have a relatively high index-of-refraction contrast between the core and both the upper and lower cladding layers, e.g., about 0.57, for core and cladding indices of about 3.5 and 1.5, respectively. As already indicated above, a high index-of-refraction contrast is advantageous in that it enables waveguide grating 240 to provide efficient energy transfer between the waveguide modes of waveguide 220 and the unguided vertical optical beams formed or received by the waveguide grating. In other words, a relatively "strong" grating is employed to diffract much of the light in a relatively short distance, e.g., the distance equal to the fiber mode width, which is achieved, e.g., by having a very low upper-cladding index with respect to the core index. Such a "strong" grating reduces the effective index of the core and, thus, for the light to still be guided by the core in the grating region, the lower cladding is implemented with a very low index with respect to the core index.

The light diffracted by waveguide grating 240 in the negative Z direction impinges on and is partially reflected by an interface 211 between cladding layers 206 and 212 (see FIGS. 2A and 2C). The reflected light then interferes with the light diffracted by waveguide grating 240 in the positive Z direction. In one embodiment, the thickness of cladding layer 212 underneath waveguide grating 240 is chosen so that the light reflected off interface 211 interferes constructively with the light diffracted by the waveguide grating in the positive Z direction. The constructive interference is advantageous in that it improves the coupling efficiency between the PIC having optical coupler 200 and an external optical fiber positioned next to the upper (in the projection of FIG. 2A) side of the coupler near waveguide grating 240.

Eq. (2) provides guidance for selecting (i) the thickness of cladding layer 212 underneath waveguide grating 240 and (ii) certain parameters of the waveguide grating:

$$L_s n_s + L_{\text{eff}} n_g = p \frac{\lambda}{2} \quad (2)$$

where $L_s$ and $n_s$ are the thickness and refractive index, respectively, of cladding layer 212; $L_{\text{eff}}$ is the effective distance between interface 211 and waveguide grating 240; $n_g$ is the refractive index of core layer 214 in waveguide grating 240; $\lambda$ is the wavelength of light; and p is a positive integer. The dimensions corresponding to $L_s$ and $L_{\text{eff}}$ are marked in FIG. 2C.

The energy-transfer efficiency of grating 240 can be optimized for any selected wavelength or a range or wavelengths by using a corresponding appropriate pattern of cavities, grooves, or holes. For example, the above-cited U.S. Pat. No. 7,065,272 discloses patterns that can be used for efficiently coupling light having wavelengths between about 1500 nm and about 1600 nm. One skilled in the art will appreciate that, to obtain a waveguide grating suitable for efficient coupling of other wavelengths, the disclosed patterns can be modified, e.g., by appropriately changing the periodicity of cavities in the grating.

Figure 3A:
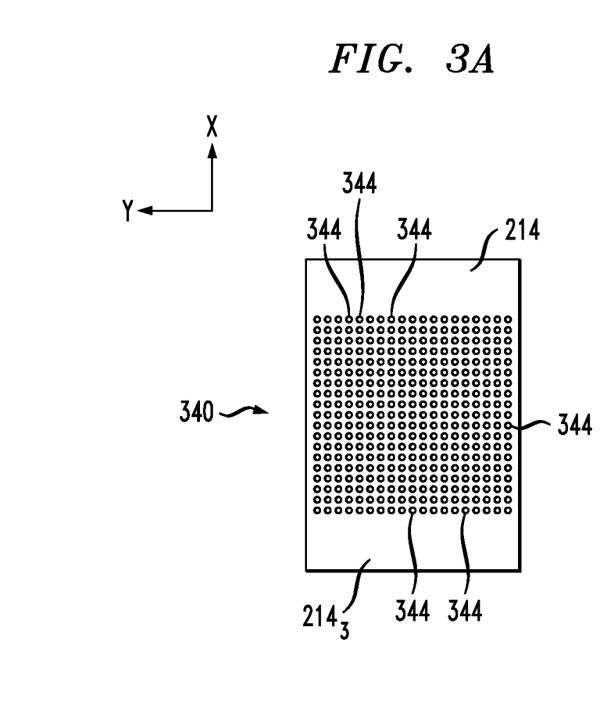
FIGS. 3A-B show top views of two representative patterns that can be used in the waveguide grating of the optical coupler shown in FIG. 2 according to some embodiments of the invention.
Figure 3B:
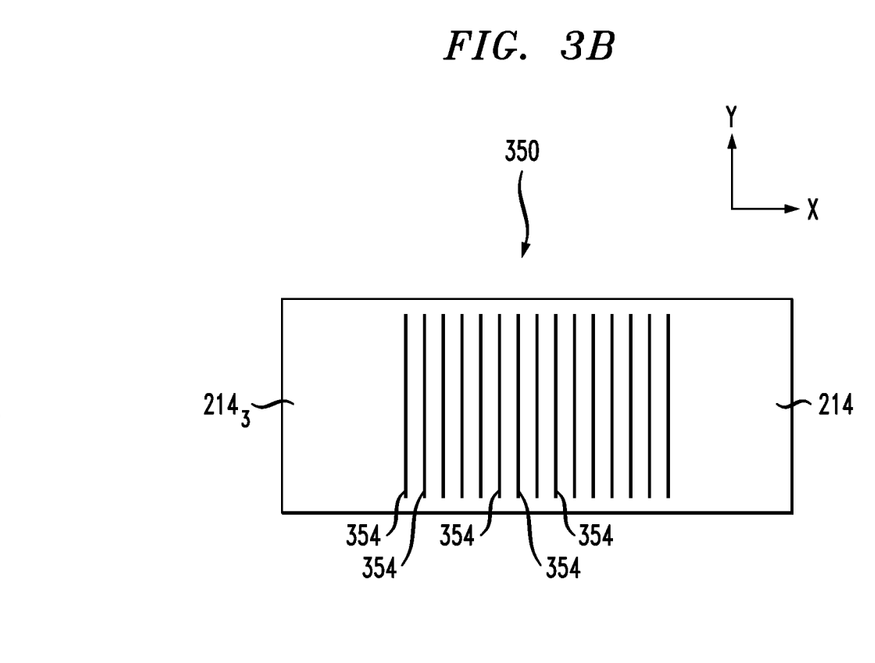

FIGS. 3A-B show top views of patterns 340 and 350, respectively, which can be used in waveguide grating 240 according to some embodiments of the invention. Pattern 340 (FIG. 3A) comprises a plurality of holes 344 arranged in rows in a rectangular configuration. Pattern 350 (FIG. 3B) comprises a plurality of parallel grooves 354. The pitch of each pattern along the X direction is approximately $\lambda/n$, where n is the refractive index of the grating material. In one embodiment, the depth of holes 344 and grooves 354 is between about 100 nm and about 200 nm. The diameter of holes 344 and the width of grooves 354 are between about 40% and 60% of the pitch.

Numerical simulations of optical coupler 200 (FIG. 2A) having waveguide-grating pattern 350 (FIG. 3B) indicate that the optical coupler can provide a coupling efficiency between waveguide 210 and an external optical fiber of about 35%. Representative characteristics of the various components of the optical coupler used in the numerical simulations are as follows: (i) GaInAsP core layer 204 having a refractive index of about 3.388 and a thickness of about 200 nm; (ii) InP cladding layers 202/206 having a refractive index of about 3.17; (iii) amorphous-silicon core layer 214 having a refractive index of about 3.48 and a thickness of about 400 nm; and (iv) silicon-oxide cladding layers 212/216 having a refractive index of about 1.58. The vertical separation between core layers 204 and 214 within structure 230 is 200 nm, which results in a half-beat distance $\Lambda$ of about 10.5 µm (see also Eq. (1)). The thickness of cladding layer 212 underneath waveguide grating 240 is about 700 nm.

Figure 4:
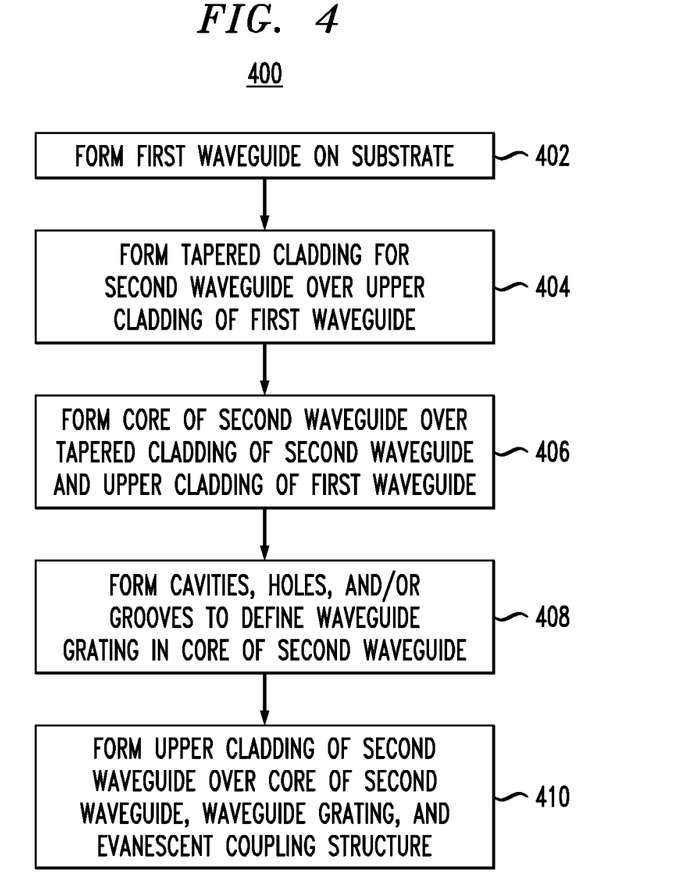
FIG. 4 shows a flowchart of a fabrication method that can be used to manufacture the optical coupler of FIG. 2 according to one embodiment of the invention

FIG. 4 shows a flowchart of a fabrication method 400 that can be used to manufacture optical coupler 200 according to one embodiment of the invention. As evident from the description that follows, method 400 is readily amenable to high-volume industrial production. In contrast, a typical prior-art method for fabricating an optical coupler with a coupling efficiency comparable to that of optical coupler 200 is rather complicated and is not suitable for high-volume industrial production, e.g., because it involves a step of flip-chip bonding two separate preprocessed wafers, one corresponding to the active portion of the PIC and the other to the waveguide grating.

At step 402 of method 400, waveguide 210 is formed by (i) depositing or growing core layer 204 on substrate 202; (ii) patterning and etching core layer 204 using lithographic methods to form a desired footprint layout for waveguide 210; and (iii) depositing or growing cladding layer 206 over core layer 204 and substrate 202 (see FIG. 2A). Note that the processing of sub-step (ii) can be at least partially performed concurrently with step 410.

At step 404, wedged cladding layer 212 is formed over cladding layer 206 (see FIG. 2A). At a first sub-step of step 404, initial cladding layer 212 is deposited or grown on cladding layer 206 so that the layer extends across the entire width of the nascent coupler, e.g., from the left side to the right side of FIG. 2A. At a second sub-step of step 404, part of cladding layer 212 corresponding to core-layer portion $214_3$ and waveguide grating 240 is masked off, and the resulting structure is subjected to wet-etch processing. Since silicon oxide (a typical material for implementing cladding layer 212) is an amorphous material, it etches in a substantially isotropic manner, thereby creating a naturally sloped wall near the edge of the mask. This sloped wall becomes the wedged portion of cladding layer 212 located beneath core-layer portion $214_2$ in FIG. 2A. The angle of the wedge is a function of the vertical etch rate and the lateral etch rate, both of which are controlled by the chemical composition of the etchant and the temperature at which the wet etch is carried out. Cladding layer 206 serves as an etch stop in the unmasked portion of the structure. After the wet etch is completed, the mask is stripped off.

At step 406, core layer 214 is deposited over wedged cladding layer 212 and the exposed part of cladding layer 206. A suitable deposition method for step 406 is plasma-enhanced chemical vapor deposition or electron-beam evaporation. The vertical profile of core layer 214 generally conforms to the topology of its base layers, i.e., cladding layers 212 and 206. Deposited core layer 214 is then patterned and etched using lithographic methods to form desired footprint layouts for waveguide 220 and evanescent coupler 230.

At step 408, core layer 214 produced at step 406 is patterned and etched in the portion corresponding to waveguide grating 240 to form cavities, holes, and/or grooves that define the grating.

At step 410, cladding layer 216 is deposited over the structure produced at step 408. The outer surface of cladding layer 216 is polished and optionally covered by an anti-reflection coating to create the final structure of optical coupler 200 shown in FIG. 2A.

As used in this specification, the term "index-of-refraction contrast" refers to a value obtained by dividing the difference between the refractive indices of the core and the cladding by the refractive index of the core.

The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope. For example, various optical devices can be implemented as corresponding monolithic PICs, including implementations as substantially planar receiver cards or circuits.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required.

Conversely, the terms "directly coupled," "directly connected," etc., imply the absence of such additional elements.

What is claimed is:

1. A method of fabricating an optical device, comprising:
   providing a substrate having a first optical waveguide thereon, the first optical waveguide having a first cladding layer;
   forming a second cladding layer with a wedge-like portion on the first cladding layer by (i) forming a layer of cladding material over the first optical waveguide and (ii) subjecting said layer of cladding material to a wet-etch process to form from said layer of cladding material the wedge-like portion;
   forming a core of a second optical waveguide on the wedge-like portion; and
   forming an array of cavities in the core of the second optical waveguide to define therein a waveguide grating.

2. The method of claim 1, further comprising forming on the substrate an optical signal-processing (OSP) circuit, wherein:
   the first optical waveguide is optically coupled to the OSP circuit;
   the OSP circuit comprises at least one active optical element; and
   the first and second optical waveguides, the waveguide grating, and the OSP circuit are parts of a photonic integrated circuit (PIC) formed on the substrate.

3. The method of claim 1, wherein, for a predetermined operating wavelength, an offset distance between the waveguide grating and an interface of a cladding of the first optical waveguide with a cladding of the second waveguide is selected to cause constructive interference between (i) light of said operating wavelength diffracted by the waveguide grating toward the interface and then reflected back by the interface and (ii) light of said operating wavelength diffracted by the waveguide grating in a direction collinear with a propagation direction of the reflected light.

4. The method of claim 1, wherein
   a core of the first optical waveguide comprises a ternary, quaternary, or quinary group III-V alloy;
   the first cladding layer comprises a binary group III-V compound;
   the core of the second waveguide comprises silicon; and
   the wedge-like portion comprises silicon oxide.

5. The method of claim 1, further comprising forming a multilayered structure having the substrate, a core of the first optical waveguide, the first cladding layer, the second cladding layer, the core of the second optical waveguide, and a third cladding layer by:
   depositing or growing a first core layer on the substrate;
   patterning and etching the first core layer in accordance with a footprint layout of the first optical waveguide to form the core of the first optical waveguide;
   depositing or growing the first cladding layer over the core of the first optical waveguide and the substrate;
   said forming the second cladding layer with the wedge-like portion on the first cladding layer;
   depositing or growing a second core layer over the first cladding layer and the second cladding layer with the wedge-like portion;
   patterning and etching the second core layer in accordance with a footprint layout of the second optical waveguide to form the core of the second optical waveguide;
   said forming the array of cavities in the core of the second optical waveguide; and
   depositing or growing the third cladding layer over the core of the second optical waveguide, the second cladding layer with the wedge-like portion, and the first cladding layer.

6. The method of claim 5, wherein:
   the first cladding layer comprises a first material; and
   the second cladding layer comprises a second material different from the first material.

7. The method of claim 6, wherein the substrate comprises a third material different from the first material and from the second material.

8. The method of claim 6, wherein the third cladding layer comprises a third material different from the first and second materials.

9. The method of claim 8, wherein the substrate comprises a fourth material different from the first, second, and third materials.

10. The method of claim 5, wherein said patterning and etching the first core layer comprises forming a laterally tapered portion of the core of the first optical waveguide.

11. The method of claim 5, wherein:
   the first core layer is directly connected to the substrate;
   the first cladding layer is directly connected to the first core layer;
   the second cladding layer is directly connected to the first cladding layer;
   the second core layer is directly connected to the second cladding layer; and
   the third cladding layer is directly connected to the second core layer.

12. The method of claim 11, wherein:
   a portion of the second core layer is directly connected to the first cladding layer; and
   a portion of the third cladding layer is directly connected to the first cladding layer.

13. The method of claim 1, wherein an index-of-refraction contrast of the second optical waveguide is greater than an index-of-refraction contrast of the first optical waveguide.

14. The method of claim 1, wherein the first cladding layer has a thickness that causes the first and second optical waveguides to be optically coupled to each other via an evanescent field.

15. The method of claim 1, further comprising forming a photonic integrated circuit on the substrate, wherein the photonic integrated circuit comprises the first optical waveguide, the second optical waveguide, and the waveguide grating.

16. The method of claim 15, wherein the photonic integrated circuit comprises at least one active optical element.

* * * * *